US009613467B2

(12) United States Patent
Roberts et al.

(10) Patent No.: US 9,613,467 B2
(45) Date of Patent: Apr. 4, 2017

(54) METHOD OF UPDATING AND CONFIGURING A SCAN TOOL

(75) Inventors: Robert Roberts, South Euclid, OH (US); Michael Gessner, Akron, OH (US); Thomas Bertosa, Chardon, OH (US); Phillip Freshour, Richfield, OH (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 1405 days.

(21) Appl. No.: 11/976,948

(22) Filed: Oct. 30, 2007

(65) Prior Publication Data

US 2009/0112397 A1    Apr. 30, 2009

(51) Int. Cl.
| | | |
|---|---|---|
| *G01M 17/00* | (2006.01) | |
| *G06Q 30/00* | (2012.01) | |
| *G07C 5/00* | (2006.01) | |
| *G06F 9/445* | (2006.01) | |

(52) U.S. Cl.
CPC ............... *G07C 5/008* (2013.01); *G06F 8/60* (2013.01); *G06F 8/61* (2013.01); *G06F 8/65* (2013.01); *G07C 2205/02* (2013.01)

(58) Field of Classification Search
CPC ......... G07C 2205/02; G06F 8/60; G06F 8/61; G06F 8/63; G06F 8/64; G06F 8/65; G06F 8/66; G06F 8/665; G06F 8/67; G06F 8/68; H04L 45/56; H04L 45/563; H04L 41/082; H04L 29/08117; H04L 67/06; H04L 67/34; H04N 21/8166; H04N 21/8173; H04N 21/818; H04N 21/8186; H04N 21/8193

USPC .. 701/1, 29, 33, 33.2, 29.6, 32.6, 29.1, 31.4, 701/33.1, 34.4; 717/168–178
See application file for complete search history.

(56) References Cited

U.S. PATENT DOCUMENTS

| | | | | |
|---|---|---|---|---|
| 5,935,180 | A  * | 8/1999  | Fieramosca | G01R 31/007 324/133 |
| 6,134,488 | A  * | 10/2000 | Sasaki et al. | 701/31 |
| 6,181,992 | B1 * | 1/2001  | Gurne et al. | 701/29 |
| 6,208,948 | B1 * | 3/2001  | Klingler et al. | 702/183 |
| 6,556,904 | B1 * | 4/2003  | Larson et al. | 701/33 |
| 6,859,699 | B2 * | 2/2005  | Carroll | G07C 5/008 701/32.6 |
| 6,874,680 | B1 * | 4/2005  | Klaus et al. | 235/375 |
| 7,000,063 | B2 * | 2/2006  | Friedman | G11C 8/20 711/103 |
| 7,050,892 | B1 * | 5/2006  | Liebl et al. | 701/29 |
| 7,209,860 | B2 * | 4/2007  | Trsar et al. | 702/183 |
| 7,469,172 | B2 * | 12/2008 | Shah | 701/29 |

(Continued)

OTHER PUBLICATIONS

SPX Service Solutions, "Scan Tool Software Applications Installation and Updates", Dec. 13, 2005.*

(Continued)

*Primary Examiner* — Thomas G Black
*Assistant Examiner* — Sara Lewandroski
(74) *Attorney, Agent, or Firm* — Baker Hostetler LLP (57) ABSTRACT

A software and method for updating a scan tool with limited memory are provided. An available diagnostic software database is located remotely from the scan tool. The diagnostic software database is vastly larger than the available memory on the scan tool. The technician can access the database and download the software modules he needs based on the vehicle or vehicles he is servicing and the available scan tool memory.

19 Claims, 5 Drawing Sheets

(56) References Cited

U.S. PATENT DOCUMENTS

| | | | |
|---|---|---|---|
| 7,734,287 B2* | 6/2010 | Ying | 455/423 |
| 2003/0109972 A1* | 6/2003 | Tak | 701/29 |
| 2004/0083041 A1* | 4/2004 | Skeen et al. | 701/35 |
| 2004/0227523 A1* | 11/2004 | Namaky | H04L 67/125 |
| | | | 324/537 |
| 2004/0230356 A1* | 11/2004 | Namaky | 701/29 |
| 2004/0249557 A1* | 12/2004 | Harrington et al. | 701/115 |
| 2005/0043869 A1* | 2/2005 | Funkhouser | G07C 5/0808 |
| | | | 701/33.4 |
| 2005/0090940 A1* | 4/2005 | Pajakowski et al. | 701/1 |
| 2005/0256590 A1* | 11/2005 | Choi | H04L 67/34 |
| | | | 700/20 |
| 2005/0283285 A1* | 12/2005 | Ying | 701/29 |
| 2006/0101311 A1* | 5/2006 | Lipscomb | G07C 5/008 |
| | | | 714/47.1 |
| 2006/0122746 A1* | 6/2006 | Gawlik et al. | 701/29 |
| 2006/0142906 A1* | 6/2006 | Brozovich et al. | 701/29 |
| 2006/0173591 A1* | 8/2006 | Knapp et al. | 701/33 |
| 2007/0016900 A1* | 1/2007 | Brandt et al. | 717/168 |
| 2007/0050105 A1* | 3/2007 | Chinnadurai et al. | 701/29 |
| 2007/0073460 A1* | 3/2007 | Bertosa et al. | 701/29 |
| 2007/0155487 A1* | 7/2007 | Nakano et al. | 463/29 |
| 2007/0198148 A1* | 8/2007 | Namaky | 701/29 |
| 2007/0240146 A1* | 10/2007 | Chinnadurai et al. | 717/168 |
| 2007/0244611 A1* | 10/2007 | Brozovich | G07C 5/008 |
| | | | 701/31.5 |
| 2008/0028395 A1* | 1/2008 | Motta et al. | 717/177 |
| 2008/0104583 A1* | 5/2008 | Wempen | G06F 8/65 |
| | | | 717/168 |
| 2008/0162063 A1* | 7/2008 | Suzuki | B60R 16/0231 |
| | | | 702/81 |
| 2008/0269975 A1* | 10/2008 | Bertosa et al. | 701/29 |
| 2008/0282343 A1* | 11/2008 | Schrijen et al. | 726/18 |
| 2009/0064135 A1* | 3/2009 | Jimmerson | G06F 8/61 |
| | | | 717/178 |
| 2009/0076678 A1* | 3/2009 | Namaky | 701/33 |
| 2009/0112397 A1* | 4/2009 | Roberts et al. | 701/35 |
| 2010/0256865 A1* | 10/2010 | Ying | 701/33 |
| 2010/0262335 A1* | 10/2010 | Brozovich | 701/33 |
| 2010/0273477 A1* | 10/2010 | Namaky | 455/426.1 |

OTHER PUBLICATIONS

Taylor, Dave "Check Free Space on Windows XP", published prior to Jan. 13, 2006, http://www.askdavetaylor.com/check_free_space_on_windows_xp.html.*

Taylor, "Check Free Space on Windows XP," Jan. 13, 2006, Ask Dave Taylor, http://www.askdavetaylor.com/check_free_space_on_windows_xp/.*

* cited by examiner

METHOD OF UPDATING AND CONFIGURING A SCAN TOOL

FIELD OF THE INVENTION

The present invention relates generally to a vehicle diagnostic device. More particularly, the present invention relates to updating and configuring a scan tool.

BACKGROUND OF THE INVENTION

Modern vehicles typically have one or more diagnostic systems, generally having separate computer control modules to control various functions of the vehicle. Some examples include powertrain control module (PCM), engine control module (ECM), a transmission control module (TCM), anti-locking brake system (ABS) module, and an air bag control module. The vehicle diagnostic systems often have self-diagnostic capability to detect and alert the driver of problems the vehicle may be encountering. When a problem is found, a diagnostic trouble code or DTC, is set within the computer's memory. DTCs are as general or as specific as the manufacturer desires.

To retrieve and decipher DTCs, an auto repair technician needs a diagnostic tool, such as a scan tool. The scan tool must, therefore, be connected to the vehicle's computer bus system to access and retrieve the DTCs. Scan tools are testing devices that interface with vehicle diagnostic systems to retrieve information from the various control modules. The scan tools are equipped to communicate in various communication protocols such as Controller Area Network (CAN), J1850 VPM and PWM, ISO 9141, Keyword 2000 and others. These communications protocols may be specific to the various automobile manufacturers. The scan tool will help the technician to diagnose and repair the vehicle based on the information the tool retrieves from it.

The amount of information that can be stored on a scan tool is tied to the amount of memory the scan tool has. Scan tools are currently programmed at the factory with all the necessary information for all vehicles for a desired cover range, such as from 1996-2000. The desired range may be more than what the technician needs and thus the additional memory in the scan tool is wasted with unnecessary information. Memory is one of the costly components of the scan tool, thereby excessive memory makes the scan tool cost more than necessary.

Therefore, it is desirable to provide a method that allows a technician to configure the scan tool to contain only the desired information specific to the vehicle or vehicles that he is working on.

SUMMARY OF THE INVENTION

The foregoing needs are met, to a great extent, by the present invention, wherein in one aspect an apparatus is provided that in some embodiments allow a scan tool to be configured with the diagnostic software it needs even when its memory is limited.

In accordance with one embodiment of the present invention, a method of updating an automotive scan tool is provided and can include a logging in to a computer that includes a vehicle diagnostic software database, the database containing diagnostic software modules for various vehicles, entering a vehicle identifying information into the computer so that the computer can identify the available diagnostic software modules for the identified vehicle, providing a list of available diagnostic software modules based on the identified vehicle, selecting the vehicle diagnostic software modules from a list of available software modules based on the entered vehicle, downloading the selected vehicle diagnostic software modules that will fit in an available memory of the scan tool, and loading the selected vehicle diagnostic software modules onto the automotive scan tool.

In accordance with another embodiment of the present invention, a method of updating an automotive scan tool is provided and can include a logging in to a computer that includes a vehicle diagnostic software database, the database containing diagnostic software modules for various vehicles, entering a vehicle identifying information into the computer so that the computer can identify the available diagnostic software modules for the identified vehicle, providing a list of available diagnostic software modules based on the identified vehicle, selecting the vehicle diagnostic software modules from a list of available software modules based on the entered vehicle, licensing the selected vehicle diagnostic software modules for use on the automotive scan tool, downloading the selected vehicle diagnostic software modules, and loading the selected vehicle diagnostic software modules onto the automotive scan tool.

In accordance with yet another embodiment of the present invention, an article is provided, which comprises a machine-accessible medium having associated data, wherein the data, when accessed, can result in a machine displaying a login screen on a display of a computer, the computer includes a vehicle diagnostic software database, the database containing diagnostic software modules for various vehicles, displaying a vehicle identification screen on the display so that a user can enter vehicle identifying information into the computer so that the computer can identify the available diagnostic software modules for the identified vehicle, displaying a list screen that list the available diagnostic software modules based on the identified vehicle, displaying a selection screen so that the user can select the vehicle diagnostic software modules from the list of available software modules, licensing the selected vehicle diagnostic software modules for use on the automotive scan tool, and displaying a downloading screen so that the user can selected how the vehicle diagnostic software modules will be downloaded.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

The invention will now be described with reference to the drawing figures, in which like reference numerals refer to like parts throughout. An embodiment of the present invention provides a method that can be used to update or configure a scan tool with only the desired information that the technician needs.

Figure 1:
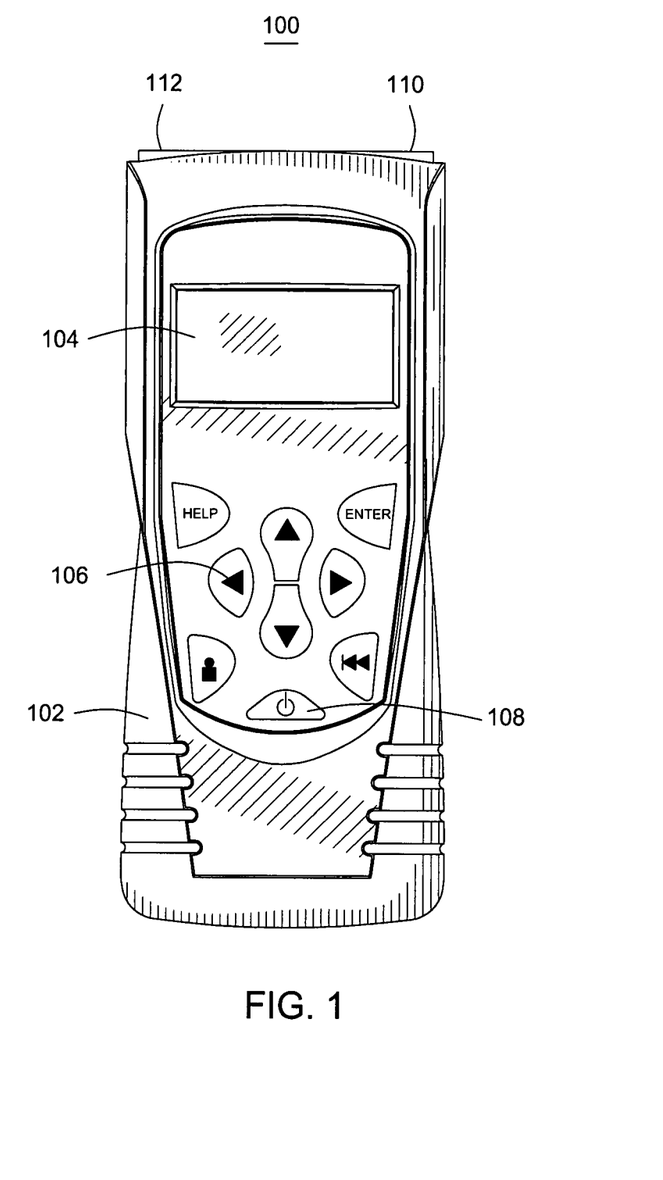
FIG. 1 is a front view illustrating a scan tool according to an embodiment of the invention.

An embodiment of the present inventive apparatus is illustrated in FIG. 1. In particular, FIG. 1 is a front view illustrating a scan tool 100 according to an embodiment of the invention. The scan tool 100 can be any computing device, such as, for example, the Nemisys scan tool from Service Solutions (a unit of the SPX Corporation) in Owatonna, Minn. or Elite Autoscanner® Pro CP9190 from Actron also a unit of Service Solutions. The scan tool 100 includes a housing 102 to house the various components of the scan tool, such as a display 104, a user interface 106, a power key 108, a memory card reader 110 (optional) and a connector interface 112. The display 104 can be any display, for example, LCD (liquid crystal display), VGA (video graphics array), touch display (can also be a user interface), etc. The user interface 106 allows the user to interact with the scan tool in order to operate the scan tool as desired. The user interface 106 can include function keys, arrow keys or any other type of keys that can manipulate the scan tool 100 in order to operate various menus that are presented on the display. The input device 106 can also be a mouse or any other suitable input device, including a keypad. The user interface 106 can also include numbers or be alphanumeric. The power key 108 allows the user to turn the scan tool 100 on and off, as required. The scan tool 100 can be powered by an internal battery (not shown), A/C or D/C source or off of a battery in the vehicle being serviced.

Memory card reader 110 can be a single type card reader, such as a compact flash card, floppy disc, memory stick, secure digital, multimedia card, xD-picture card, smart media, flash memory or other types of memory. The memory card reader 110 can be a reader that reads more than one of the aforementioned memory such as a combination memory card reader. Additionally, the memory card reader 110 can also read any other computer readable medium, such as CD, DVD, UMD, etc. The scan tool may already have software for a vehicle or multiple vehicles that a technician may want. For example, it may have diagnostic information for a 2006 Chevrolet Corvette or for Corvette years 2000-2006. According to an embodiment of the invention, the scan tool is designed to be less costly and with limited memory. Thus, the scan tool will need to be reconfigured with additional diagnostic information if the technician wants to use the scan tool on other vehicles.

The connector interface 112 allows the scan tool 100 to connect to an external device, such as an ECU of a vehicle, a computing device, an external communication device (such as a modem), a network, etc. through a wired or wireless connection. Connector interface 112 can also include a USB, FIREWIRE, modem, RS232, RS485, and other connections to communicate with external devices, such as a hard drive, USB drive, CD player, DVD player, UMD player or other computer readable medium devices.

Figure 2:
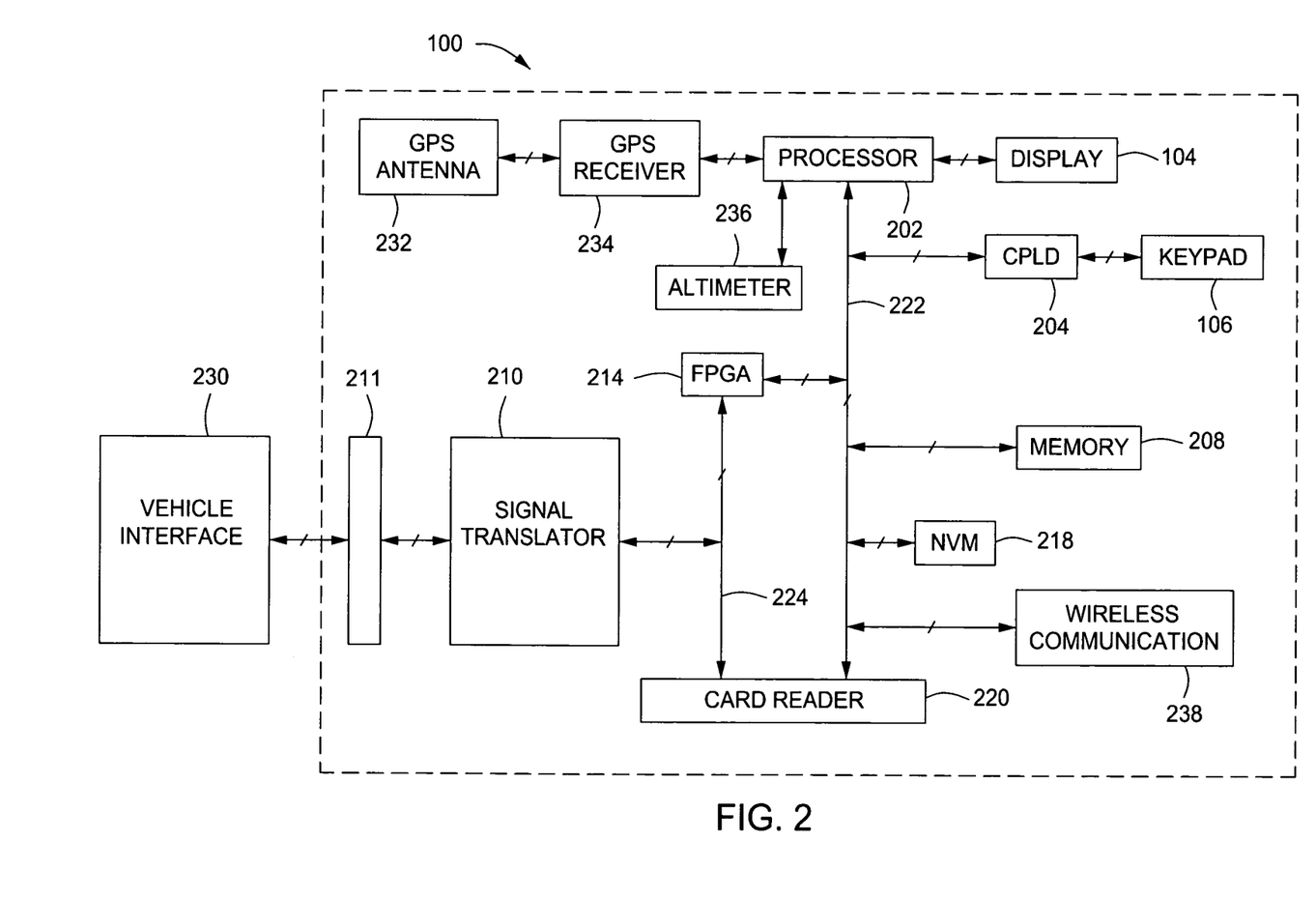
FIG. 2 is a block diagram of the components of the scan tool according to an embodiment of the invention.

FIG. 2 is a block diagram of the components of the scan tool 100. In FIG. 2, the scan tool 100 according to an embodiment of the invention includes a processor 202, a field programmable gate array (FPGA) 214, a first system bus 224, the display 104, a complex programmable logic device (CPLD) 204, the user interface in the form of a keypad 106, a memory subsystem 208, an internal non-volatile memory 218, a card reader 220, a second system bus 222, a connector interface 211, a selectable signal translator 210, a GPS antenna 232, a GPS receiver 234, an optional altimeter 236 and a wireless communication circuitry 238. A vehicle communication interface 230 is in communication with the scan tool 100 through connector interface 211 via an external cable (not shown).

Selectable signal translator 210 communicates with the vehicle communication interface 230 through the connector interface 211. Signal translator 210 conditions signals received from an ECU unit through the vehicle communication interface 230 to a conditioned signal compatible with scan tool 100. Signal translator 210 can communicate with, for example, the following communication protocols: J1850 (VPM and PWM), ISO 9141-2 signal, communication collision detection (CCD) (e.g., Chrysler collision detection), data communication links (DCL), serial communication interface (SCI), S/F codes, J1708, RS232, Controller Area Network (CAN), Keyword 2000 (ISO 14230-4), OBD II or other communication protocols that are implemented in a vehicle.

The circuitry to translate and communicate via a particular communication protocol can be selected by FPGA 214 (e.g., by tri-stating unused transceivers) or by providing a keying device that plugs into the connector interface 211 that is provided by scan tool 100 to connect scan tool 100 to vehicle communication interface 230. Signal translator 210 is also coupled to FPGA 214 and the card reader 220 via the first system bus 224. FPGA 214 transmits to and receives signals (i.e., messages) from the ECU unit through signal translator 210.

The FPGA 214 is coupled to the processor 202 through various address, data and control lines by the second system bus 222. FPGA 214 is also coupled to the card reader 220 through the first system bus 224. The processor 202 is also coupled to the display 104 in order to output the desired information to the user. The processor 202 communicates with the CPLD 204 through the second system bus 222. Additionally, the processor 202 is programmed to receive input from the user through the user interface 106 via the CPLD 204. The CPLD 204 provides logic for decoding various inputs from the user of scan tool 100 and also provides glue-logic for various other interfacing tasks.

Memory subsystem 208 and internal non-volatile memory 218 are coupled to the second system bus 222, which allows for communication with the processor 202 and FPGA 214. Memory subsystem 208 can include an application dependent amount of dynamic random access memory (DRAM), a hard drive, and/or read only memory (ROM). Software to run the scan tool 100 can be stored in the memory subsystem 208, including any database.

Internal non-volatile memory 218 can be an electrically erasable programmable read-only memory (EEPROM), flash ROM, or other similar memory. Internal non-volatile memory 218 can provide, for example, storage for boot code, self-diagnostics, various drivers and space for FPGA images, if desired. If less than all of the modules are implemented in FPGA 214, memory 218 can contain downloadable images so that FPGA 214 can be reconfigured for a different group of communication protocols.

The GPS antenna 232 and GPS receiver 234 may be mounted in or on the housing 102 or any combination thereof. The GPS antenna 232 electronically couples to the GPS receiver 234 and allows the GPS receiver to communicate (detects and decodes signals) with various satellites that orbit the Earth. The GPS receiver 234 electronically couples to the processor 202, which is coupled to memory 208, NVM 218 or a memory card in the card reader 220.

Wireless communication circuit 238 communicates with the processor via second bus system 222. The wireless communication circuit can be configured to communicate to satellites, cellular phones (analog or digital), Bluetooth®, Wi-Fi, Infrared, Local Area Networks, Wide Area Networks, Wi-Max or other wireless communication. The wireless communication circuit allows the scan tool to communicate with other devices wirelessly, such as a remote computer.

Figure 3:
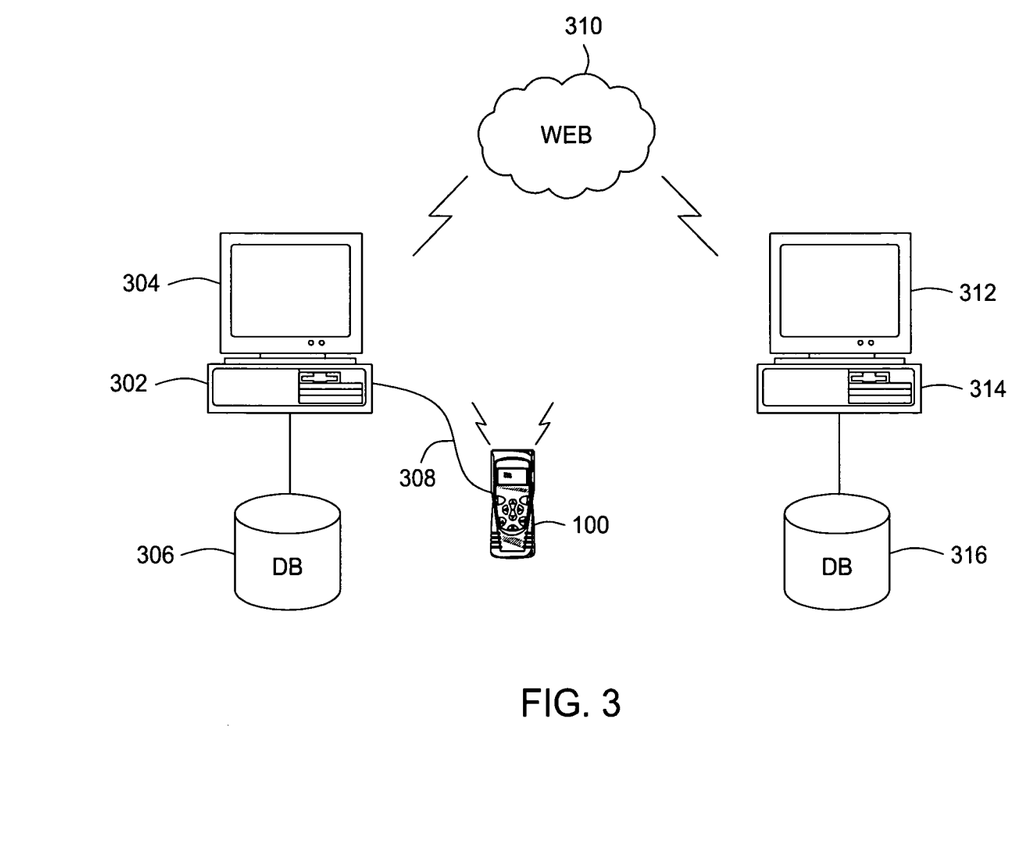
FIG. 3 illustrates an embodiment of the invention to update the scan tool 100.

FIG. 3 illustrates an embodiment of the invention to update the scan tool 100. The scan tool can be updated wirelessly by connecting to a computer 302, through a USB connection 308 or via flash memory. The computer 302 includes a display 304 and all the components that are known in a computer. The computer may be located in a garage, a service center, a dealership, an auto parts store or a store where a scan tool (code reader) are sold (Wal-Mart and Target, for example). A vehicle diagnostic database 306 may be linked to the computer 302. The vehicle diagnostic database 306 may be stored on a memory device internally or externally to the computer 302. The vehicle diagnostic database contains all the diagnostic information available for every vehicle.

When the technician logs into the computer and is allowed access to the vehicle diagnostic database 306, he can select the vehicle (or enter identifying information of the vehicle) and the diagnostic software modules that he would like to have on the scan tool. For example, if he wants to diagnose a 2006 Toyota Camry, he can select that model in the vehicle diagnostic database and download the diagnostic software module for that vehicle. The diagnostic software modules can be downloaded onto a flash memory previously described. The flash memory can communicate with the computer 306 via the USB connection or the card reader. Alternatively, the software modules can be downloaded onto a computer readable medium such as CD, DVD, UMD and the like. In an alternative embodiment, the technician can login to a remote computer 314 (with display 312) via an internet connection 310. The internet connection can be made through computer 302 or wirelessly with the scan tool 100.

The selected diagnostic software modules may be transferred to the scan tool 100 via a wireless connection, where the scan tool 100 can download only the necessary diagnostic software modules that are needed for the vehicle the technician is working on. The vehicle diagnostic database will include all models and years that are available, which can be separately purchased, as part of various diagnostic software modules, by the technician. Examples included in the vehicle diagnostic database are USA Domestic 2001, 2002, 2003, 2004, 2005, 2006; ASIAN 2000, 2003, 2006; European 2003 and 2006; ABS/AIRBAG 2002 and 2004; all available from Service Solutions. Within the examples above, the technician can download only a portion of that software or software modules. For example, if his garage only handles BMWs then he can purchase certain models (325i, 328, 330, 340, X3, X5, etc.) or certain range of years for all BMW models (2001-2007), or for a certain vehicle with various years or for all models for a year or two or any other combination from the European 2003 and 2006. The vehicle diagnostic database may also include information for ABS or specific systems.

The downloaded diagnostic software modules can include a license and/or security features that allow the diagnostic software modules to be used only with a particular scan tool (for example, based on serial number or other identifying information of the scan tool or with a "cookie" implanted in the scan tool's software) or be transferred for a limited number of times from one scan tool to another or be transferred for a limited number of times from the computer containing the diagnostic software database to a flash memory or the scan tool. The license/security features will prevent unauthorized uses of the software (such as copying) or having the software loaded on unauthorized scan tools. The license and/or security features are verified by a software module licensing module 500 (see FIG. 5), which can prevent use of the software modules by unauthorized scan tools, allow use of the software modules by authorized scan tools, and update the license for the software module to reflect changes in the license, such as those discussed herein. Thus, the invention allows the technician to customize his scan tool with only software modules or modules he wants and needs and prevents unauthorized transfers or uses of the purchased software modules. The technician can erase or add software depending on his needs and the available memory of the scan tool.

Figure 4:
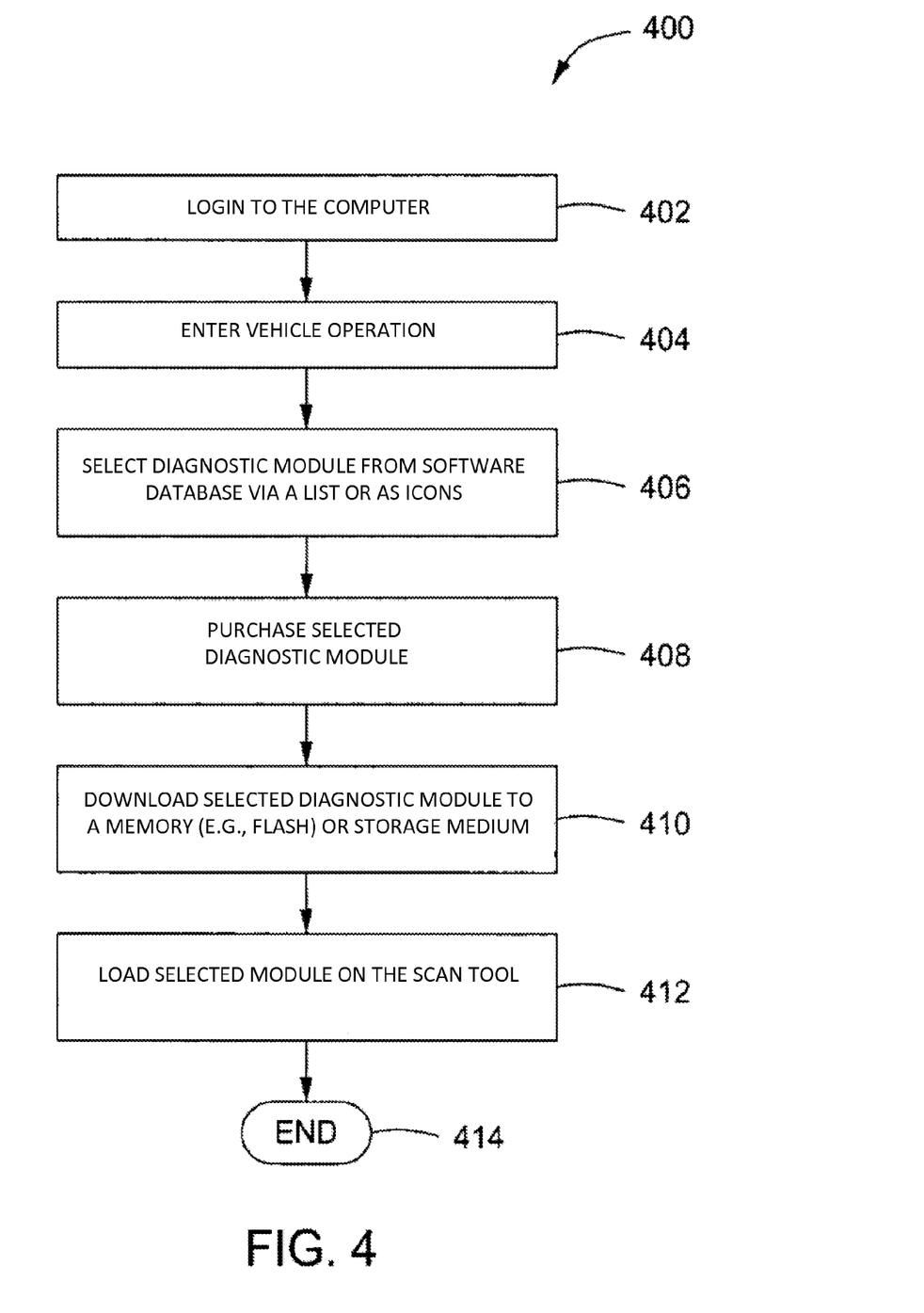
FIG. 4 illustrates a method of configuring and updating the scan tool according to an embodiment of the invention.

FIG. 4 illustrates a method of configuring and updating the scan tool according to an embodiment of the invention. The method 400 starts at step 402, where a login screen can be displayed to the technician via a login screen display module 502 (see FIG. 5), and where the technician can login to the computer that stores the diagnostic software database. The diagnostic software database may be located on a computer in the service garage, a store (parts store or any store that sells auto parts such as Wal-Mart, Target, etc.) or on a remote computer, for example. The technician can enter in his login ID and password information or create a login ID and password at a login screen presented on the computer (302 or 314). The login ID will be linked to the technician's account (or garage or corporate account) so that he can pay for the software that he is about to purchase. In some embodiments, the diagnostic software database was previously purchased. At step 404, a vehicle identification screen can be displayed to the technician via a vehicle identification screen display module 504 (see FIG. 5), and the technician can enter vehicle information such as the VIN, the make and model or any other vehicle information. Alternatively, the technician can select the vehicle from a list of make and models. The computer will then display a software module list screen via a software module list screen display module 506 (see FIG. 5), providing the technician the available diagnostic software module or modules for that vehicle via a list or as icons and the like. Additionally, the computer can scan the available memory in the scan tool and provide the available memory information to the technician displayed on an available scan tool memory screen via an available scan tool memory screen display module 508 (see FIG. 5). The memory information allows the technician to know how many software modules he can add to the scan tool at any time. Examples of the diagnostic software modules are described above. At step 406, the technician is displayed a software module selection screen via a software module selection screen display module 510 (see FIG. 5), and the technician then selects the diagnostic software modules that he wants to download from the list or icons. At step 408, the technician can then purchase the software modules that he wants via a software module purchase module 512 (see FIG. 5) (if not previously purchased). The technician can pay for each individual software module, as a bundle of software modules or unlimited download for a period of time (subscription based). The payment can be made via any crediting means, for example, credit card, debit card, wire transfers, pay service (for example, PayPal or Google Pay) or checks or any combination thereof. Other embodiments include prepaid cards including gift cards, a prepaid account or a prepaid subscription account.

Figure 5:
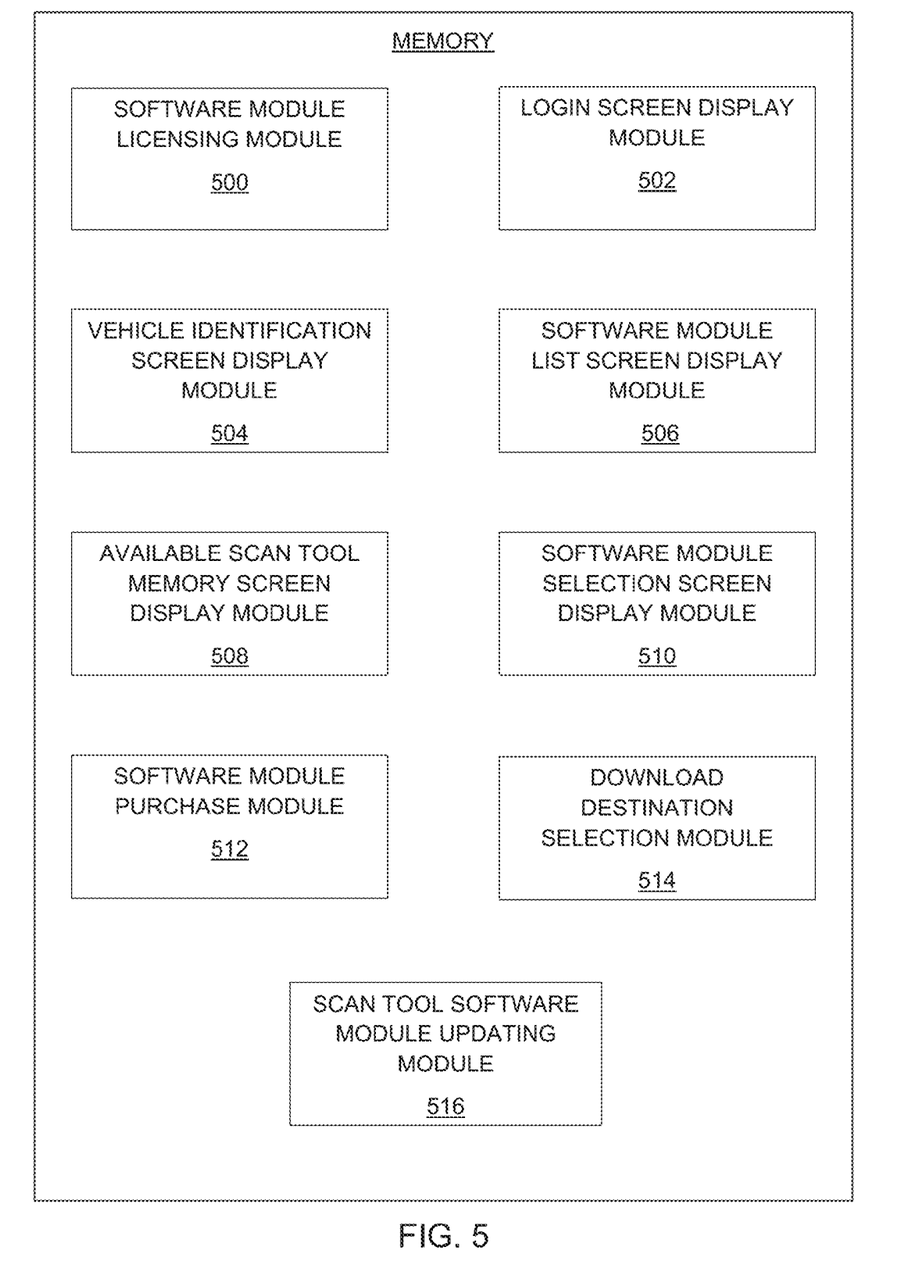
FIG. 5 is a block diagram of the module components of the scan tool according to an embodiment of the invention.

At step 410, the technician can select how he wants the selected diagnostic software modules to be downloaded from the database via a download destination selection module 514 (see FIG. 5). The options include, but are not limited to, downloading wirelessly to the scan tool 100 or via a wired connection, such as via USB or downloading to a flash memory device. At step 412, the selected software can be uploaded and used to reprogram the scan tool via a scan tool software module updating module 516 (see FIG. 5). Method 400 ends at step 414. Once loaded, the scan tool can be used to diagnose the selected vehicle.

In other embodiments, the flash memory can be preprogrammed so that it includes only certain vehicle models, a certain year range or features that a technician may want to purchase similar to method described above. This way, the diagnostic software modules can be sold in a store and are ready to be uploaded onto a scan tool. For example, if the technician wants to diagnose the 2006 Camry, the technician would go to the aisle or to the counter at an auto part store and request a flash memory device that includes the diagnostic software modules for the vehicle he wants to diagnose. It would be preloaded onto a flash memory device such as a USB flash drive. He can then purchase the USB flash drive and then load the purchased diagnostic software onto his scan tool via the scan tool software module updating module 516 (see FIG. 5).

In another embodiment, the technician can subscribe to a subscription that allows for a certain number of downloads of the diagnostic software modules for a given period of time. For example, he may be able to purchase a certain number of vehicles per year, such as 12 vehicles for one price. In another example, he may be able to download and store up to three diagnostic software modules for that one scan tool, but would be able to "trade" them out for different software modules as long as the number of diagnostic software modules does not exceed three. Licensing software, for example, the software module licensing module 500, may be downloaded so that it can verify how many of the licensed diagnostic software modules are on the scan tool. Alternatively, the licensing software for example, the software module licensing module 500, may be on the computer with the database and the licensing software can determine how many licensed software modules are on the scan tool via a wired or wireless connection.

With the embodiments described herein, the technician can purchase only the modules he wants from the software database. This allows him to service any vehicle he wants without having to purchase a costly all inclusive software package.

The embodiments described herein can be performed via a software program that is programmed to execute software modules stored on either or both of the scan tool memory subsystem 208 or a memory of the computer 302 in any combination. The software modules can include, for example, (1) the software module licensing module 500, which can prevent use of the software modules by unauthorized scan tools, allow use of the software modules by authorized scan tools, and update the license for the software module to reflect changes in the license, such as those discussed herein: (2) the login screen display module 502, which can display a login screen on a display of the computer so that the technician can sign in or create a new login ID; (3) the vehicle identification screen display module 504, which can display a screen on the display of the computer that displays a list of available vehicles that the vehicle diagnostic software database covers, or display an input screen on the display of the computer so that the technician can enter vehicle identification information; (4) the software module list screen display module 506, which can query the vehicle diagnostic software database to provide available diagnostic software module(s) based on the identified vehicle, and display on a screen a list or icons of available modules for the identified vehicle; (5) the available scan tool memory screen display module 508, which can scan the available memory in the scan tool and provide the available memory information to the technician; (6) the software module selection screen display module 510, which can allow the technician to select the diagnostic software modules that he wants to download from the list or icons; (7) the software module purchase module 512, which can display a purchase screen so that the technician can purchase the selected software modules; (8) the download destination selection module 514, which can display a download option screen so that the technician can select his preferred method of downloading the selected software modules; and (9) the scan tool software module updating module 516, which can upload and reprogram the scan tool with the selected software modules. The aforementioned steps described how a software program can include these steps in order to assist the technician with his purchase and the steps do not have to be performed in order or all of them being performed at all. A combination of the steps may be programmed to obtain the desired results.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, failing within the scope of the invention.

What is claimed is:

1. A method of updating an automotive scan tool, comprising the steps of:
receiving login information, via an input device, at a computer that includes a vehicle diagnostic software database, the database containing diagnostic software modules for various vehicles;

receiving vehicle identifying information entered into the computer so that the computer can identify the available diagnostic software modules for the identified vehicle;

providing, on a display, a list of available diagnostic software modules based on the identified vehicle;

scanning an available memory of the scan tool with the computer to determine an available memory;

displaying, on the display, the available memory;

receiving a selection of the vehicle diagnostic software modules from a list of available software modules based on the entered vehicle;

displaying, on the display, a downloading screen that provides options for selection for downloading the vehicle diagnostic software modules including downloading wirelessly to the scan tool, downloading to the scan tool through a wired connection, and downloading to a memory device; and downloading the selected vehicle diagnostic software modules based on the selected one of downloading wirelessly to the scan tool, downloading to the scan tool through the wired connection, and downloading to the memory device.

2. The updating method of claim 1 further comprising the step of purchasing the selected vehicle diagnostic software modules.

3. The updating method of claim 2, wherein the step of purchasing is paying after the selection is selected.

4. The updating method of claim 2, wherein the step of purchasing is paying with a prepaid account.

5. The updating method of claim 1, wherein the vehicle information is the vehicle identification number.

6. The updating method of claim 1, wherein the step of downloading is to download to a flash memory device.

7. The updating method of claim 1 further comprising the step of preventing unauthorized use of the selected software modules on the scan tool if the software module is not licensed for the scan tool.

8. The updating method of claim 1 further comprising the step of preventing unauthorized use of the selected software modules on the scan tool if a license is not valid for the software modules.

9. The updating method of claim 1, wherein the computer displays the available memory on the scan tool.

10. The updating method of claim 1, wherein the computer is a remote computer connected to the scan tool or a local computer via an internet connection.

11. The updating method of claim 1, wherein entering the vehicle identifying information is selecting the vehicle from the list of make and models.

12. The updating method of claim 1, wherein the list is icons of the software modules.

13. An article comprising a machine-accessible medium having associated data, wherein the data, when accessed, results in a computer performing:

displaying a login screen on a display of the computer, the computer includes a vehicle diagnostic software database, the database containing diagnostic software modules for various vehicles;

displaying a vehicle identification screen on the display so that a user can enter vehicle identifying information into the computer so that the computer can identify the available diagnostic software modules for the identified vehicle;

displaying a list of the available diagnostic software modules based on the identified vehicle;

allowing a selection by the user of the vehicle diagnostic software modules from the list of available software modules based on the entered vehicle;

scanning an available memory of the scan tool with the computer to determine an available memory;

displaying the available memory;

displaying a downloading screen so that the user can select how the vehicle diagnostic software modules will be downloaded including downloading wirelessly to the scan tool, downloading to the scan tool through a wired connection, and downloading to a memory device; and downloading the selected vehicle diagnostic software modules based on the selected one of downloading wirelessly to the scan tool, downloading to the scan tool through a wired connection, and downloading to a memory device, wherein the selected vehicle diagnostic software modules comprise a license for use on the automotive scan tool.

14. A method of updating an automotive scan tool, comprising the steps of:

receiving login information, via an input device, at a computer that includes a vehicle diagnostic software database, the database containing diagnostic software modules for various vehicles;

receiving vehicle identifying information entered into the computer so that the computer can identify the available diagnostic software modules for the identified vehicle;

providing, on a display, a list of available diagnostic software modules based on the identified vehicle;

scanning an available memory of the scan tool with the computer to determine an available memory;

displaying, on the display, the available memory;

receiving a selection of the vehicle diagnostic software modules from a list of available software modules based on the entered vehicle;

displaying, on the display, a downloading screen that provides options for selection for downloading the vehicle diagnostic software modules including downloading wirelessly to the scan tool, downloading to the scan tool through a wired connection, and downloading to a memory device; and downloading the selected vehicle diagnostic software modules based on the selected one of downloading wirelessly to the scan tool, downloading to the scan tool through the wired connection, and downloading to the memory device, wherein the selected vehicle diagnostic software modules comprise a license for use on the automotive scan tool.

15. The updating method of claim 14 further comprising the step of purchasing the selected vehicle diagnostic software modules.

16. The updating method of claim 14, wherein the license authorizes the vehicle diagnostic software modules to be used on any scan tool.

17. The updating method of claim 14, wherein the license authorizes the vehicle diagnostic software modules to be used on an authorized scan tool.

18. The updating method of claim 14, wherein the license authorizes the vehicle diagnostic software modules to be copied for a predetermined amount of time.

19. The updating method of claim 14, wherein licensing is authorizing the number of times vehicle diagnostic software modules may be downloaded onto the scan tool for a predetermined period of time.

* * * * *